US 12,472,694 B2

United States Patent
Li et al.

(10) Patent No.: US 12,472,694 B2
(45) Date of Patent: Nov. 18, 2025

(54) METHOD AND DEVICE FOR PLACING 3D MODEL UTILIZING A MONOTONE QUEUE ALGORITHM

(71) Applicant: SHENZHEN CBD TECHNOLOGY CO., LTD., Guangdong (CN)

(72) Inventors: Yilong Li, Guangdong (CN); Yu Yi, Guangdong (CN)

(73) Assignee: SHENZHEN CBD TECHNOLOGY CO., LTD., Guangdong (CN)

(*) Notice: Subject to any disclaimer, the term of this patent is extended or adjusted under 35 U.S.C. 154(b) by 355 days.

(21) Appl. No.: 18/010,338

(22) PCT Filed: Jul. 13, 2020

(86) PCT No.: PCT/CN2020/101723
§ 371 (c)(1),
(2) Date: Dec. 14, 2022

(87) PCT Pub. No.: WO2022/011516
PCT Pub. Date: Jan. 20, 2022

(65) Prior Publication Data
US 2023/0226769 A1 Jul. 20, 2023

(51) Int. Cl.
*B29C 64/393* (2017.01)
*B33Y 50/02* (2015.01)
*G06T 19/20* (2011.01)

(52) U.S. Cl.
CPC ........... *B29C 64/393* (2017.08); *B33Y 50/02* (2014.12); *G06T 19/20* (2013.01)

(58) Field of Classification Search
CPC .................................................. B29C 64/393
See application file for complete search history.

(56) References Cited

U.S. PATENT DOCUMENTS

| 10,518,473 | B2 | 12/2019 | Huang et al. |
| 2014/0060115 | A1 | 3/2014 | Saarela et al. |

(Continued)

FOREIGN PATENT DOCUMENTS

| CN | 103678800 A | 3/2014 | |
| CN | 105931296 A * | 9/2016 | ............. B33Y 50/00 |

(Continued)

OTHER PUBLICATIONS

International Search Report and Written Opinion; Issued: Apr. 20, 2021; International Application No. PCT/CN2020/101723, Filed: Jul. 13, 2020, 8 pages.

*Primary Examiner* — Suresh Suryawanshi
(74) *Attorney, Agent, or Firm* — CANTOR COLBURN LLP

(57) ABSTRACT

The present application relates to the technical field of 3D printing, and more particularly to a method and a device for placing a 3D model, a computer-readable storage medium, and a 3D printer. The method includes: performing a dimension reduction processing to a first 3D model and a second 3D model, respectively, to obtain a first plane graphics corresponding to the first 3D model and a second plane graphics corresponding to the second 3D model; determining a minimum bounding rectangle of the first plane graphics; determining a convex hull of the second plane graphics, and determining an insertion point in the convex hull; and performing a successive insertion attempt to the minimum bounding rectangle at the insertion point, and determining a final placement position.

14 Claims, 8 Drawing Sheets

(56) References Cited

U.S. PATENT DOCUMENTS

| | | | |
|---|---|---|---|
| 2015/0363972 A1 | 12/2015 | Isaksson et al. | |
| 2018/0093417 A1* | 4/2018 | Yaw | B29C 64/393 |
| 2018/0133969 A1 | 5/2018 | Huang et al. | |
| 2020/0053347 A1 | 2/2020 | Marchak, Jr. et al. | |
| 2020/0122388 A1* | 4/2020 | Van Esbroeck | B29C 64/393 |
| 2020/0379436 A1* | 12/2020 | Riss | B29C 64/386 |
| 2020/0398495 A1* | 12/2020 | Roca | G06N 3/08 |
| 2022/0012944 A1* | 1/2022 | Roca Vila | G06T 17/20 |

FOREIGN PATENT DOCUMENTS

| | | | | |
|---|---|---|---|---|
| CN | 105989605 A | | 10/2016 | |
| CN | 107635750 A | | 1/2018 | |
| CN | 108859110 A | * | 11/2018 | B29C 64/188 |
| CN | 109255836 | * | 1/2019 | |
| CN | 109255836 A | | 1/2019 | |
| CN | 109408001 A | | 3/2019 | |
| CN | 109978063 A | | 7/2019 | |
| CN | 111382485 | * | 3/2020 | |
| CN | 110989491 A | | 4/2020 | |
| CN | 111382485 A | | 7/2020 | |
| EP | 3401084 A1 | * | 11/2018 | B29C 64/112 |
| JP | 2010210511 A | | 9/2010 | |

* cited by examiner initial state

First insertion attempt

METHOD AND DEVICE FOR PLACING 3D MODEL UTILIZING A MONOTONE QUEUE ALGORITHM

CROSS REFERENCE TO RELATED APPLICATION

This application is a National Stage Application of International Patent Application No. PCT/CN2020/101723, with an international filing date of Jul. 13, 2020, the contents of all of the aforementioned application, including any intervening amendments thereto, are incorporated herein by reference.

FIELD

The present application relates to the technical field of 3D printing, and more particularly to a method and a device for placing a 3D model, a computer-readable storage medium, and a 3D printer.

BACKGROUND

In the existing 3D printing technology, in order to make full use of time and space resources, two or more 3D models can be printed at the same time. However, in the process of pre-processing the model, the model is generally placed based on the experience of the operator, and the space between the two models is often too large, which results in low space utilization and low production efficiency.

SUMMARY

Embodiments of the present application provide a method and a device for placing a 3D model, a computer-readable storage medium, and a 3D printer, to overcome the problem in the art that the space utilization is low and the production efficiency is low.

A first aspect of an embodiment of the present application provides a method for placing a 3D model, which can include steps of:
  performing a dimension reduction processing to a first 3D model and a second 3D model, respectively, to obtain a first plane graphics corresponding to the first 3D model and a second plane graphics corresponding to the second 3D model;
  determining a minimum bounding rectangle of the first plane graphics;
  determining a convex hull of the second plane graphics, and determining an insertion point in the convex hull; and
  performing a successive insertion attempt to the minimum bounding rectangle at the insertion point, and determining a final placement position.

Further, the step of determining an insertion point in the convex hull includes:
  sampling the convex hulls to obtain depth values of sampling points;
  traversing the depth values of the sampling points using monotone queue algorithm to obtain output values of the sampling points; and
  determining a sample point with a greatest output value to be the insertion point.

Further, the step of traversing the depth values of the sampling points using monotone queue algorithm to obtain output values of the sampling points includes:
  constructing a depth value sequence through the depth values of the sampling points;
  determining a sliding window corresponding to the minimum bounding rectangle; and
  successively sliding the sliding window in the depth value sequence using the monotone queue algorithm, to obtain the output values of the sliding window at the sampling points.

Further, the step of performing a successive insertion attempt to the minimum bounding rectangle at the insertion point, and determining a final placement position includes:
  performing, using a dichotomy approximation algorithm, the successive insertion attempt to the minimum bounding rectangle at the insertion point, until a boundary collision occurs between the minimum bounding rectangle and the second plane graphics;
  determining a position before the boundary collision occurs between the minimum bounding rectangle and the second plane graphics to be a first position;
  performing, using dichotomy approximation algorithm, the successive insertion attempt to the first plane graphics starting from the first position, until the boundary collision occurs between the first plane graphics and the second plane graphics; and
  determining a position before the boundary collision occurs between the first plane graphics and the second plane graphics to be the final placement position.

Further, the step of performing, using a dichotomy approximation algorithm, the successive insertion attempt to the minimum bounding rectangle at the insertion point includes:
  determining a half of an advance depth of a n-th insertion attempt to be an advance depth of a (n+1)-th insertion attempt, wherein the n is a positive integer.

Further, the step of performing a dimension reduction processing to a first 3D model and a second 3D model, respectively, to obtain a first plane graphics corresponding to the first 3D model and a second plane graphics corresponding to the second 3D model includes:
  projecting the first 3D model and the second 3D model onto a preset plane at a preset angle to obtain the first plane graphics and the second plane graphics.

Further, before performing the dimension reduction processing to a first 3D model and a second 3D model, respectively, the method further includes:
  importing a preset standard 3D model; and
  performing a model cloning according to the standard 3D model to obtain the first 3D model and the second 3D model.

A second aspect of an embodiment of the present application provides a device for placing a 3D model, which can include:
  a dimension reduction processing module, configured for performing a dimension reduction processing to a first 3D model and a second 3D model, respectively, to obtain a first plane graphics corresponding to the first 3D model and a second plane graphics corresponding to the second 3D model;
  a minimum bounding rectangle determination module, configured for determining a minimum bounding rectangle of the first plane graphics;
  an insertion point determination module, configured for determining a convex hull of the second plane graphics, and determining an insertion point in the convex hull; and an insertion attempt module, configured for performing a successive insertion attempt to the minimum bounding rectangle at the insertion point, and determining a final placement position.

Further, the insertion point determination module includes:
a sampling unit, configured for sampling the convex hulls to obtain depth values of sampling points;
a monotone queue processing unit, configured for traversing the depth values of the sampling points using monotone queue algorithm to obtain output values of the sampling points; and
an insertion point determination unit, configured for determining a sample point with a greatest output value to be the insertion point.

Further, the monotone queue processing unit includes:
a depth value sequence construction sub-unit, configured for constructing a depth value sequence through the depth values of the sampling points;
a sliding window length determination sub-unit, configured for determining a sliding window corresponding to the minimum bounding rectangle; and
a monotone queue processing sub-unit, configured for successively sliding the sliding window in the depth value sequence using the monotone queue algorithm, to obtain the output values of the sliding window at the sampling points.

Further, the insertion attempt module includes:
a first processing unit, configured for performing, using a dichotomy approximation algorithm, the successive insertion attempt to the minimum bounding rectangle at the insertion point, until a boundary collision occurs between the minimum bounding rectangle and the second plane graphics;
a first position determination unit, configured for determining a position before the boundary collision occurs between the minimum bounding rectangle and the second plane graphics to be a first position;
a second processing unit, configured for performing, using dichotomy approximation algorithm, the successive insertion attempt to the first plane graphics starting from the first position, until the boundary collision occurs between the first plane graphics and the second plane graphics; and
a final position determination unit, configured for determining a position before the boundary collision occurs between the first plane graphics and the second plane graphics to be the final placement position.

Further, the first processing unit includes:
an advance dept determination sub-unit, configured for determining a half of an advance depth of a n-th insertion attempt to be an advance depth of a (n+1)-th insertion attempt, wherein the n is a positive integer.

Further, the dimension reduction processing module specifically configured for projecting the first 3D model and the second 3D model onto a preset plane at a preset angle to obtain the first plane graphics and the second plane graphics.

Further, the device for placing the 3D mode further includes:
a model importing module, configured for importing a preset standard 3D model; and
a model cloning module, configured for performing a model cloning according to the standard 3D model to obtain the first 3D model and the second 3D model.

A third aspect of an embodiment of the present application provides a computer-readable storage medium, the computer-readable storage medium stores a computer program, when the computer program is executed by a processor, steps of implementing the method for placing the 3D model mentioned above are executed.

A fourth aspect of an embodiment of the present application provides a 3D printer, including a memory, a processor and a computer program stored in the memory and capable of running on the processor, and the processor implements the steps of the method for placing the 3D model mentioned above when executing the computer program.

A fifth aspect of an embodiment of the present application provides a computer program product, when the computer program product runs on a 3D printer, the 3D printer executes the steps of the method for placing the 3D model mentioned above.

Compared with the prior art, the embodiments of the present application have the following beneficial effects that in the embodiments of the present application, performing a dimension reduction processing to a first 3D model and a second 3D model, respectively, to obtain a first plane graphics corresponding to the first 3D model and a second plane graphics corresponding to the second 3D model; determining a minimum bounding rectangle of the first plane graphics; determining a convex hull of the second plane graphics, and determining an insertion point in the convex hull; and performing a successive insertion attempt to the minimum bounding rectangle at the insertion point, and determining a final placement position. Through the embodiments of the present application, the placement position of the model can be optimized, and as many models as possible can be placed in a limited space, which greatly improves the production efficiency.

BRIEF DESCRIPTION OF THE DRAWINGS

In order to more clearly describe the technical solution in the embodiments of the present application, the following will briefly introduce the drawings needed in the embodiments or the prior technical description. Obviously, the drawings in the following description are only some embodiments of the present application. For ordinary technicians in the art, they can also obtain other drawings based on these drawings without paying creative labor.

DETAILED DESCRIPTION OF EMBODIMENTS

Figure 1:
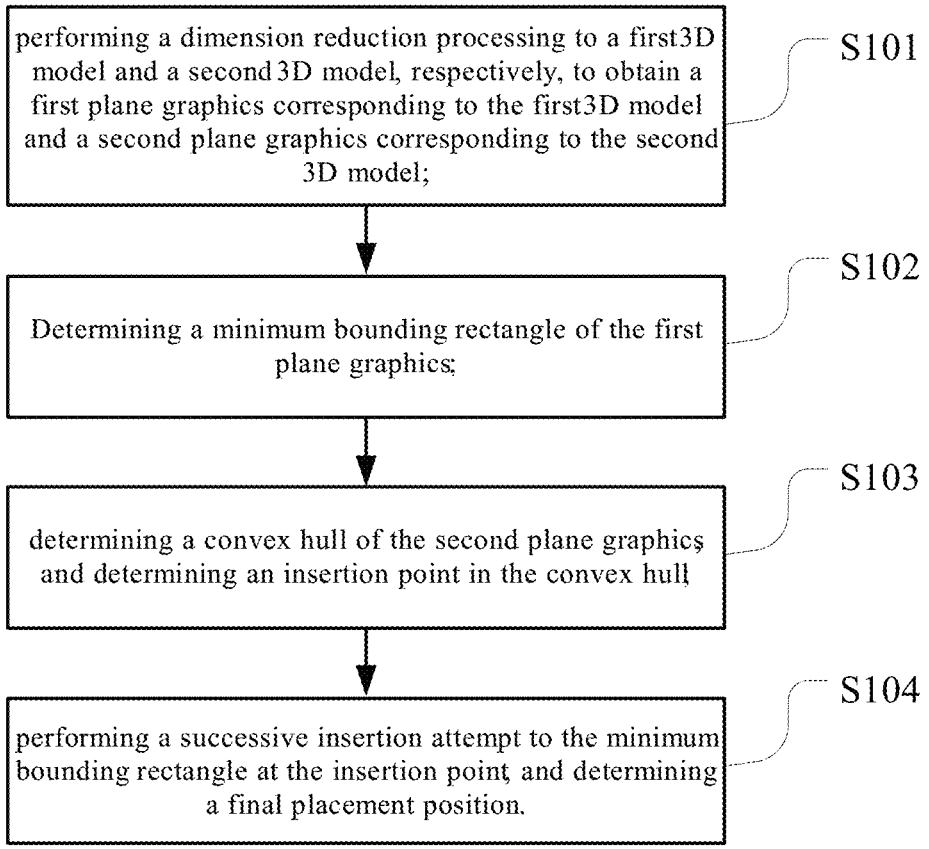
FIG. 1 is a flowchart of an embodiment of a method for placing a 3D model in the present application.

In order to make the invention purpose, features and advantages of the present application more obvious and understandable, the technical solutions in the embodiments of the present application will be described clearly and completely in combination with the drawings in the embodiments of the present application. Obviously, the embodiments described below are only part of the embodiments of the present application, not all of them. Based on the embodiments in the present application, all other embodiments obtained by ordinary technicians in the art without doing creative work belong to the scope of protection in the present application.

It should be understood that when used in the description and the appended claims, the term "including" indicates the existence of the described features, whole, steps, operations, elements and/or components, but does not exclude the existence or addition of one or more other features, whole, steps, operations, elements, components and/or combinations thereof.

It should also be understood that the terms used in the description of the present application are only for the purpose of describing specific embodiments and are not intended to limit the present application. As used in the description of the present application and the appended claims, the singular forms of "one", "one of" and "the" are intended to include the plural forms unless the context clearly indicates otherwise.

It should also be further understood that the term "and/or" used in the description of the present application and the appended claims refers to any combination of one or more of the items listed in association and all possible combinations, and includes these combinations.

As used in this specification and the appended claims, the term "if" can be interpreted as "when" or "once" or "in response to determining" or "in response to detecting" depending on the context. Similarly, the phrases "if determining" or "if [described condition or event] is detected" can be interpreted according to the context to mean "once determined" or "in response to determining" or "once [described condition or event] is detected" or "in response to detecting of [described condition or event]".

In addition, in the description of the present application, the terms "first", "second", "third", etc. are only used to distinguish descriptions, and cannot be understood as indicating or implying relative importance.

The 3D printing is a new type of rapid prototyping manufacturing technology, which manufactures products based on the principle of multi-layer superposition growth, the 3D printing can overcome the special structural obstacles that cannot be realized by traditional machining, and can realize the simple production of any complex structural components. The photo-curing 3D printing based on liquid crystal display (LCD) is to slice 3D objects through a certain algorithm and generate slice graphics, which are output on the LCD screen by the projection device. Due to the photo reaction performance of the photosensitive resin, light selectively shines on the photosensitive resin through the slice graphics, the irradiated photosensitive resin undergoes a a photo-curing reaction. After a period of time, the photo-curing reaction is complete, and the photosensitive resin changes from liquid to solid. The curing of the given graphics is completed at a certain height, that is, a layer of slices is printed. At this time, the model is raised to a certain height, that is, the height of the next layer of slice to be cured. The LCD screen outputs the graphics of the next layer of slice so that the photosensitive resin is exposed and cured with a given shape and time. After the exposure, the next layer is completed. All slicing layers are output in sequence, the next layer is always cured and shaped based on the previous layer to finally complete the curing of the whole model.

At present, in the process of photo-curing 3D printing model pre-processing, the efficient placement positions of a plurality of models in the same area have important research significance. The efficient placement strategy can place as many models as possible in a limited space, so that the models are placed neatly, the appearance is well, the space utilization is maximize, and the production efficiency can be improved.

However, under the existing technology, the placement positions of a plurality of models in the same area are basically based on human senses and experience. For the placement of a plurality of small models, it is generally disordered; the plurality of models are placed in the same area with large spacing, the space utilization is low and the production efficiency is low; For small and medium-sized models, the placement positions of the plurality of models in the same area is uneven, the appearance is uneven and the placement speed is slow. Therefore, the embodiments of the present application provide an efficient method for placing a 3D model (3D models) in a limited space.

As shown in FIG. 1, an embodiment of the method for placing the 3D model in the present application can include:

Step S101, performing a dimension reduction processing to a first 3D model and a second 3D model, respectively, to obtain a first plane graphics corresponding to the first 3D model and a second plane graphics corresponding to the second 3D model.

When the 3D printer performs 3D printing, the 3D model to be printed is needed to be imported firstly, the imported 3D model can be in Stereolithography (STL) format or other formats. The embodiment of the present application does not specifically define this.

For simplicity, when two 3D models need to be placed, one of the two 3D models can be kept unchanged, and the other can be inserted into a gap between the two 3D models as much as possible. Here, the 3D model to be inserted is recorded as the first 3D model, and the 3D model with unchanged position is recorded as the second 3D model.

The first 3D model and the second 3D model can be different models or the same model. If the first 3D model and the second 3D model are different, then the first 3D model and the second 3D model need to be imported separately. If the first 3D model and the second 3D model are the same, then a preset standard 3D model is imported, and a model cloning is performed according to the standard 3D model to obtain the first 3D model and the second 3D model.

Due to the complexity of directly considering the placement position of the model in 3D space, in the embodiment of the present application, the model can be reduced in dimension to convert the model from 3D (three-dimensional) to 2D (two-dimensional). The first 3D model and the second 3D model are projected onto the preset plane according to the preset angle to obtain the plane graphics corresponding to the first 3D model (recorded as the first plane graphics) and the plane graphics corresponding to the second 3D model (recorded as the second plane graphics).

Figure 2:
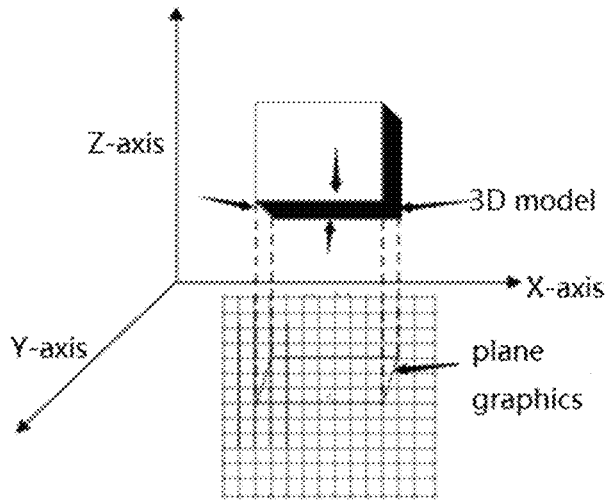
FIG. 2 is a schematic diagram of performing a dimension reduction processing to a 3D model.

FIG. 2 is a schematic diagram of performing a dimension reduction processing to a 3D model. Under the preset Cartesian coordinate system, the 3D model is projected downward along the Z-axis to the plane determined by the X-axis and Y-axis, so that cube" is converted to be "plane".

Step S102: determining a minimum bounding rectangle of the first plane image.

Figure 3:
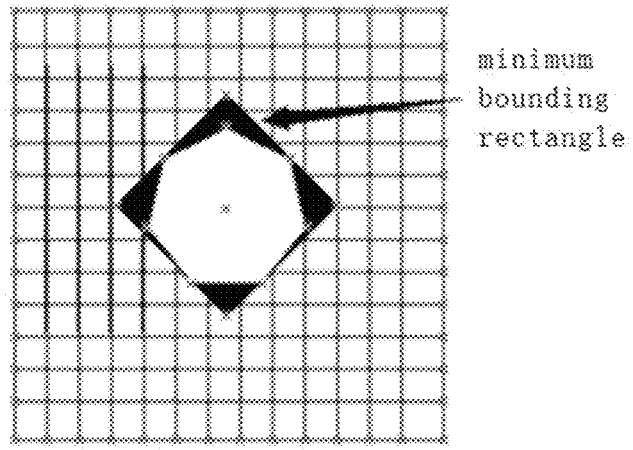
FIG. 3 is a schematic diagram of a minimum bounding rectangle.

The plane graphics projected by the 3D model is likely to be an irregular graphics, which is difficult to move and insert. In order to facilitate the rapid insertion and orderly placement of the model, as shown in FIG. 3, in the embodiment of the present application, the minimum bounding rectangle of the first plane graphics can be determined, so that all points in the first plane graphics fall into a rectangular box as small as possible.

Step S103, determining a convex hull of the second plane image, and determining an insertion point in the convex hull.

Figure 4:
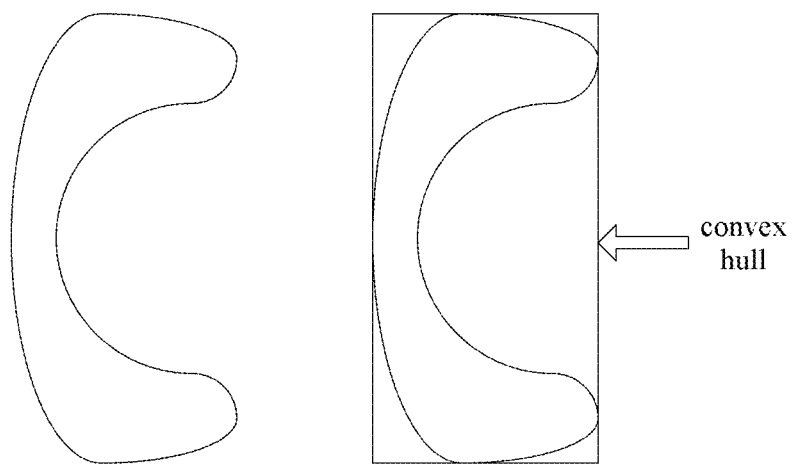
FIG. 4 is a schematic diagram of a convex hull.

Since the second plane graphics is also likely to be an irregular graphics, it can be circumscribed to determine a more regular circumscribed convex polygon, that is, the convex hull. As shown in FIG. 4, the left figure shows the original irregular graphic, and the right figure shows the convex hull.

Figure 5:
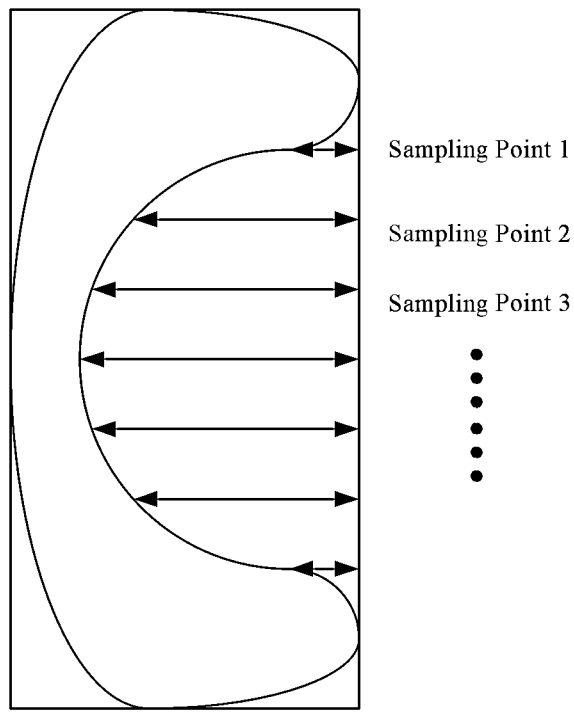
FIG. 5 is a schematic diagram of sampling on a convex hull.

After the convex hull is determined, the convex hull can be sampled to obtain the depth value of each sampling point. Specifically, as shown in FIG. 5, the sampling points can be sequentially determined on the edge of the convex hull according to the preset sampling interval. The sampling interval can be set according to the actual situation, for example, the sampling interval can be set to 0.2 mm, 0.5 mm, 1 mm or other values, which is not specifically defined in the embodiment of the present application. For any sampling point on an edge of the convex hull, a vertical line perpendicular to the edge is made through the sampling point. The vertical line intersects the second plane graphics for the first time to obtain an intersection point. The distance between the intersection point and the sampling point is determined as the depth value of the sampling point.

Figure 6:
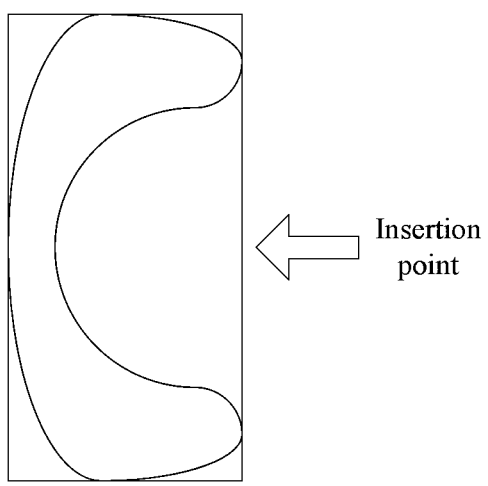
FIG. 6 is a schematic diagram of an insertion point.

After the depth values of the sampling points are obtained, the monotone queue algorithm can be used to traverse the depth values of the sampling points to obtain the output value of each sampling point. Specifically, a depth value sequence can be firstly constructed through the depth values of the sampling points; then a sliding window corresponding to the minimum bounding rectangle can be determined, the window length of the sliding window is the width of the minimum bounding rectangle, and then the sliding window is successively slid in the depth value sequence using the monotone queue algorithm, to obtain the output values of the sliding window at the sampling points. Finally, the sampling point with the greatest output value is determined as the insertion point. FIG. 6 shows the schematic diagram of the insertion point.

Step S104, performing a successive insertion attempt to the minimum bounding rectangle at the insertion point, and determining a final placement position.

Figure 7A:
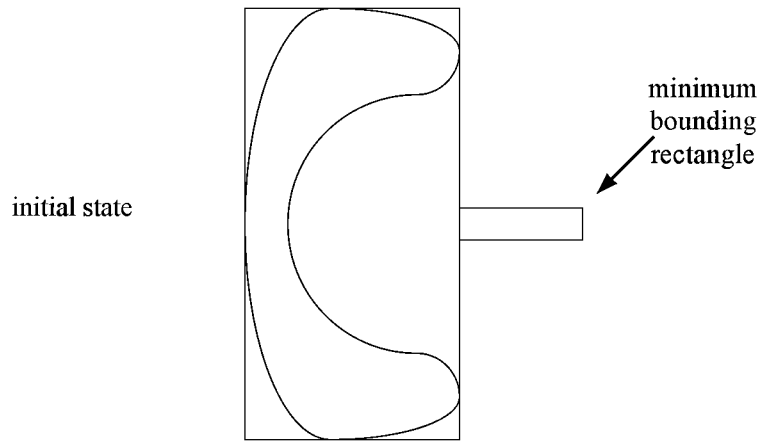
FIGS. 7A-7C are schematic diagrams of performing a successive insertion attempt using a dichotomy approximation algorithm.
Figure 7B:
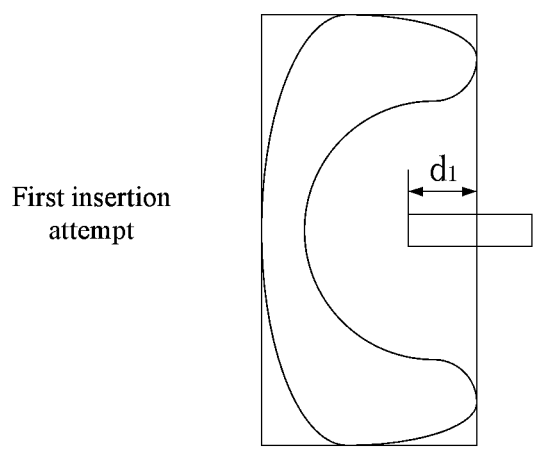
Figure 7C:
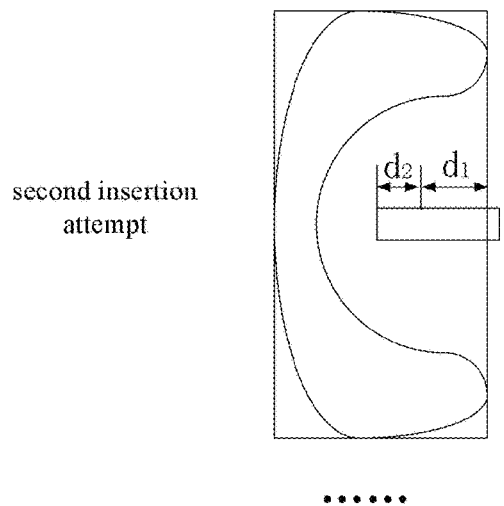

Firstly, performing, using a dichotomy approximation algorithm, the successive insertion attempt to the minimum bounding rectangle at the insertion point, until a boundary collision occurs between the minimum bounding rectangle and the second plane graphics. In the process of insertion attempt, a half of an advance depth of a n-th insertion attempt is determined to be an advance depth of a (n+1)-th insertion attempt, and the n is a positive integer. As shown in FIGS. 7A-7C, the minimum bounding rectangle is placed at the insertion point in the initial state, the advance depth of the first insertion attempt is recorded as $d_1$, the advance depth of the second insertion attempt is recorded as $d_2, \ldots$, the advance depth of the n-th insertion attempt is recorded as $d_n$, and the advance depth of the (n+1)-th insertion attempt is recorded as $d_{n+1}$, and so on, then $d_2=0.5*d_1$, $d_3=0.5*d_2$, $\ldots$, $d_{n+1}=0.5*d_n$ $\ldots$, that is, the advance depth of each insertion attempt is half of the previous insertion attempt.

When the boundary collision occurs between the minimum bounding rectangle and the second plane graphics, the position before the boundary collision occurs between the minimum bounding rectangle and the second plane graphics is determined as the first position. For example, if there is no collision occurs at the time of the fourth insertion attempt, but a collision occurs at the time of the fifth insertion attempt, the position of the minimum bounding rectangle at the time of the fourth insertion attempt is determined as the first position.

Then, the minimum bounding rectangle of the first plane graphics is removed, the successive insertion attempt is performed to the first plane graphics starting from the first position using dichotomy approximation algorithm, until the boundary collision occurs between the first plane graphics and the second plane graphics. The insertion process of the first plane graphics is similar to the insertion process of the minimum bounding rectangle, which can refer to the above specific description, which will not be repeated here.

When the first plane graphics and the second plane graphics collide at the boundary, the position before the boundary collision occurs between the first plane graphics and the second plane graphics is determined as the final placement position.

It should be noted that the above process is aimed at the placement of two models. When there are more models, the above process is still applicable. Specifically, the placement of two models can be placed firstly. After the placement position is determined, the two models can be regarded as a whole model, and then the whole model is placed together with a third model. After the placement position is determined, the three models can be regarded as a further whole model, then the further whole model is placed together with a fourth model, and so on until all models are placed.

Figure 8A:
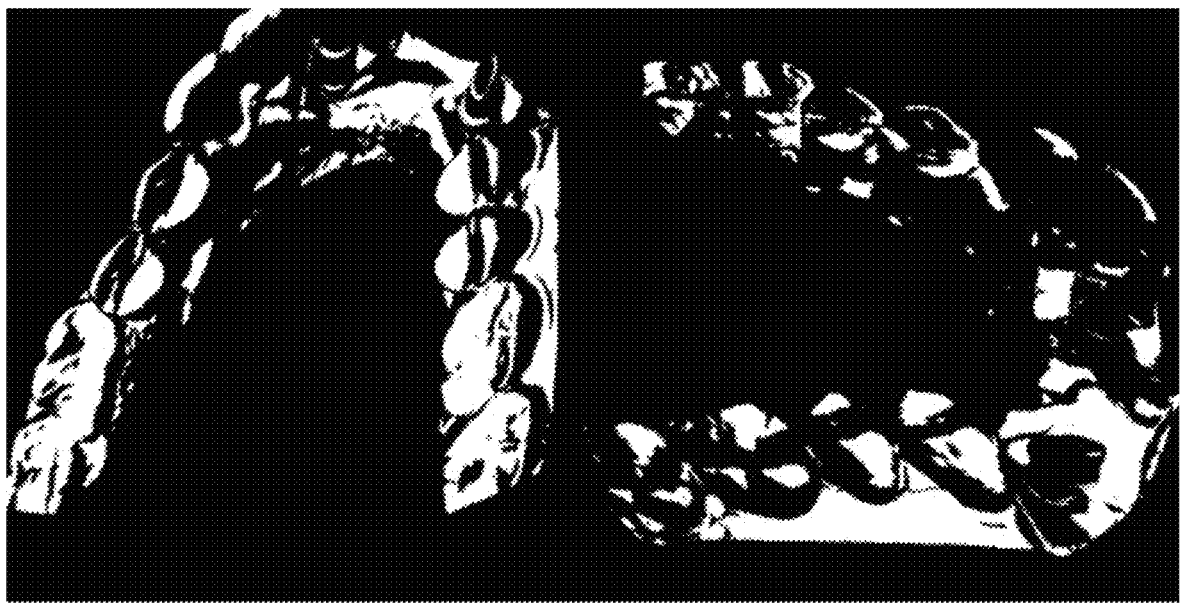
FIGS. 8A and 8B are schematic diagrams of a placement effect of a tooth model.
Figure 8B:
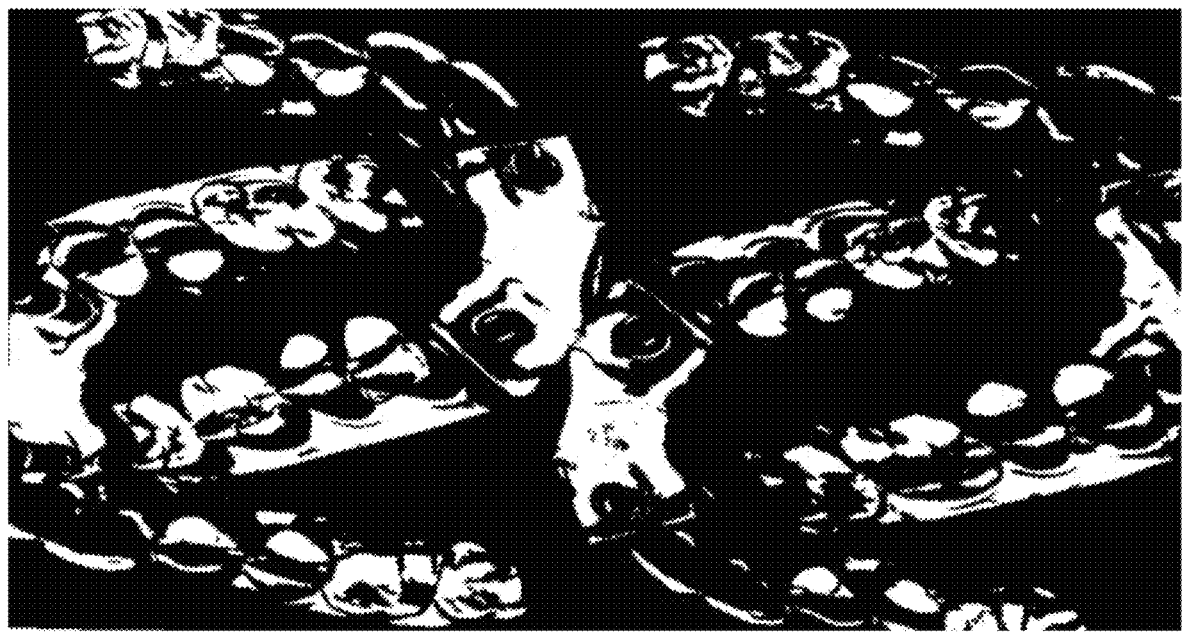
Figure 9A:
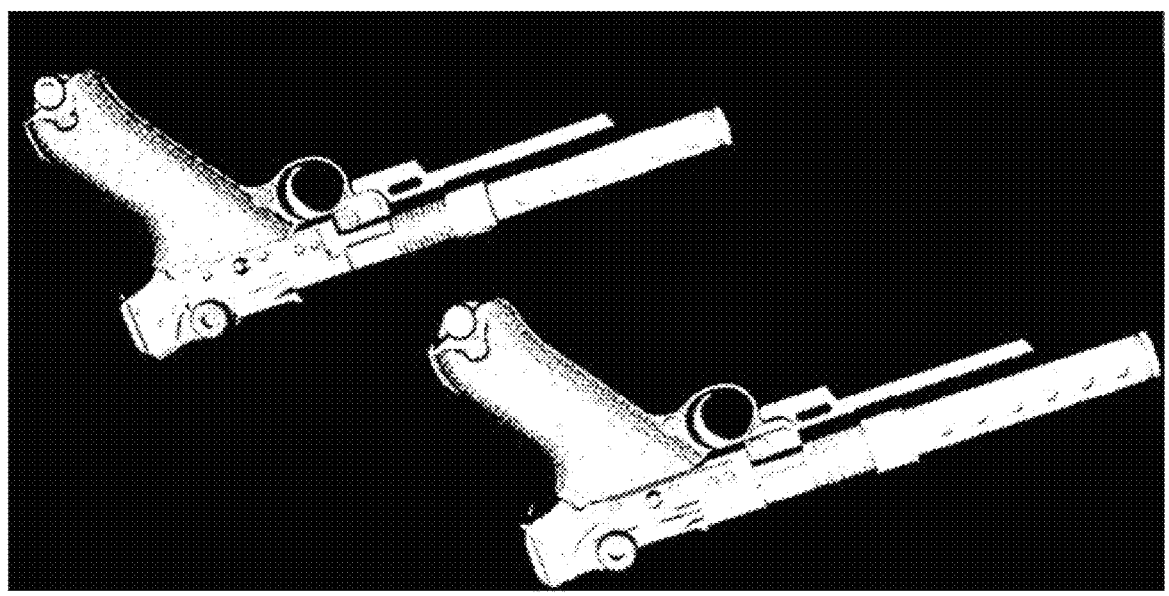
FIGS. 9A and 9B are schematic diagrams of a placement effect of a pistol toy model.
Figure 9B:
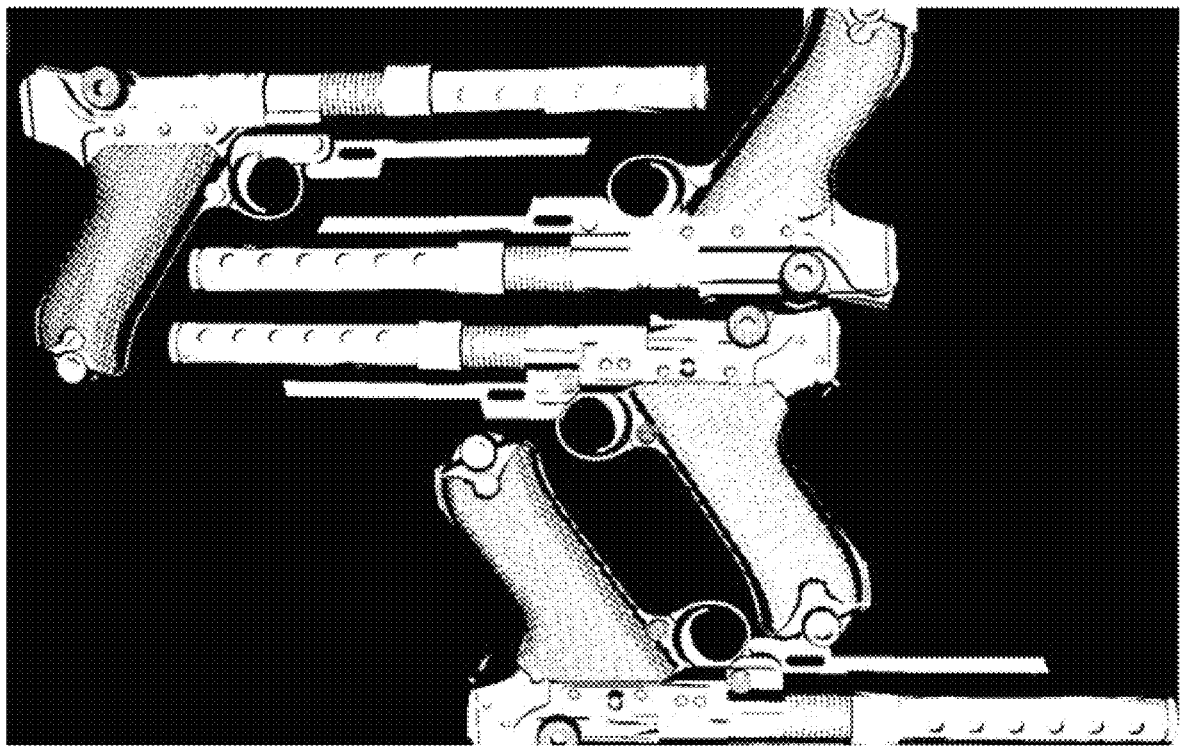

FIGS. 8A and 8B are schematic diagrams of a placement effect of a tooth model; the top figure is the schematic diagram of the effect before using the method for placing in the embodiment of the present application, and the bottom figure is the schematic diagram of the effect after using the method for placing in the embodiment of the present application. FIGS. 9A and 9B are schematic diagrams of a placement effect of a pistol toy model; the top figure is the schematic diagram of the effect before using the method for placing in the embodiment of the present application, and the bottom figure is the schematic diagram of the effect after using the method for placing in the embodiment of the present application. It can be seen that before using the method for placing in the embodiment of the present application, the models are placed in disorder and irregularity, with large space spacing and low production efficiency. After using the method for placing in the embodiment of the present application, the models are placed in order, with small space spacing and high production efficiency.

In summary, in the embodiments of the present application, performing a dimension reduction processing to a first 3D model and a second 3D model, respectively, to obtain a first plane graphics corresponding to the first 3D model and a second plane graphics corresponding to the second 3D model; determining a minimum bounding rectangle of the first plane graphics; determining a convex hull of the second plane graphics, and determining an insertion point in the convex hull; and performing a successive insertion attempt to the minimum bounding rectangle at the insertion point, and determining a final placement position. Through the embodiments of the present application, the placement position of the model can be optimized, and as many models as possible can be placed in a limited space, which greatly improves the production efficiency.

It should be understood that the size of the sequence number of the steps in the above embodiments does not mean the order of execution, and the execution order of each process should be determined by its function and internal logic, which without any restriction on the implementation process of the embodiments of the present application.

Figure 10:
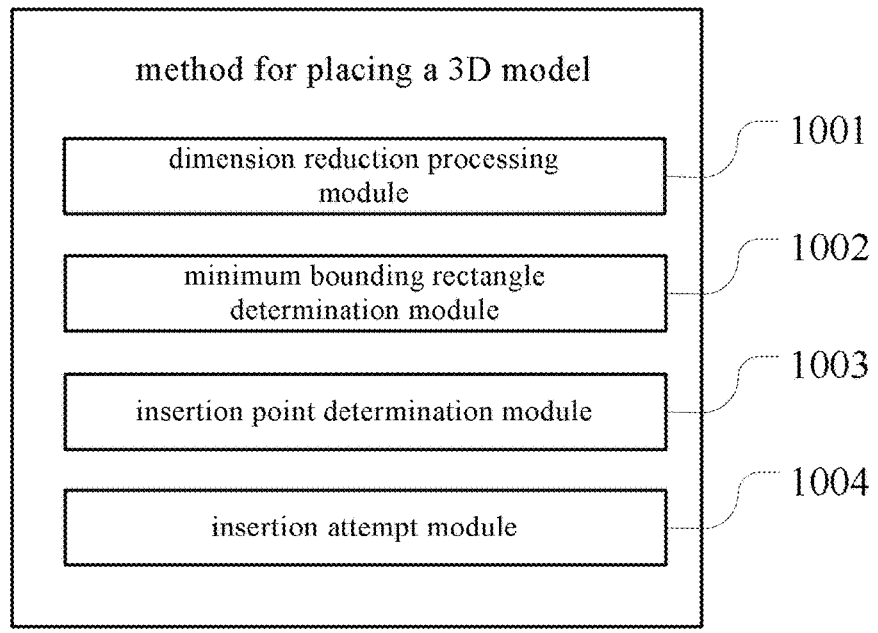
FIG. 10 is a structural diagram of an embodiment of a device for placing a 3D model in the present application.

Corresponding to the method for placing a 3D model described in the above embodiment, FIG. 10 shows an embodiment structure diagram of a device for placing a 3D model provided in the embodiment of the present application.

In the embodiment, the device for placing a 3D model can include:
- a dimension reduction processing module 1001, configured for performing a dimension reduction processing to a first 3D model and a second 3D model, respectively, to obtain a first plane graphics corresponding to the first 3D model and a second plane graphics corresponding to the second 3D model;
- a minimum bounding rectangle determination module 1002, configured for determining a minimum bounding rectangle of the first plane graphics;
- an insertion point determination module 1003, configured for determining a convex hull of the second plane graphics, and determining an insertion point in the convex hull; and
- an insertion attempt module 1004, configured for performing a successive insertion attempt to the minimum bounding rectangle at the insertion point, and determining a final placement position.

Further, the insertion point determination module can include:
- a sampling unit, configured for sampling the convex hulls to obtain depth values of sampling points;
- a monotone queue processing unit, configured for traversing the depth values of the sampling points using monotone queue algorithm to obtain output values of the sampling points; and
- an insertion point determination unit, configured for determining a sample point with a greatest output value to be the insertion point.

Further, the monotone queue processing unit can include:
- a depth value sequence construction sub-unit, configured for constructing a depth value sequence through the depth values of the sampling points;
- a sliding window length determination sub-unit, configured for determining a sliding window corresponding to the minimum bounding rectangle; and
- a monotone queue processing sub-unit, configured for successively sliding the sliding window in the depth value sequence using the monotone queue algorithm, to obtain the output values of the sliding window at the sampling points.

Further, the insertion attempt module can include:
- a first processing unit, configured for performing, using a dichotomy approximation algorithm, the successive insertion attempt to the minimum bounding rectangle at the insertion point, until a boundary collision occurs between the minimum bounding rectangle and the second plane graphics;
- a first position determination unit, configured for determining a position before the boundary collision occurs between the minimum bounding rectangle and the second plane graphics to be a first position;
- a second processing unit, configured for performing, using dichotomy approximation algorithm, the successive insertion attempt to the first plane graphics starting from the first position, until the boundary collision occurs between the first plane graphics and the second plane graphics; and
- a final position determination unit, configured for determining a position before the boundary collision occurs between the first plane graphics and the second plane graphics to be the final placement position.

Further, the first processing unit can include:
- an advance dept determination sub-unit, configured for determining a half of an advance depth of a n-th insertion attempt to be an advance depth of a (n+1)-th insertion attempt, and the n is a positive integer.

Further, the dimension reduction processing module is specifically configured for projecting the first 3D model and the second 3D model onto a preset plane at a preset angle to obtain the first plane graphics and the second plane graphics.

Furthermore, the device for placing the 3D mode can further include:
- a model importing module, configured for importing a preset standard 3D model; and
- a model cloning module, configured for performing a model cloning according to the standard 3D model to obtain the first 3D model and the second 3D model.

Those skilled in the art can clearly understand that, for the convenience and simplicity of description, the specific working process of the above described devices, modules and units can refer to the corresponding process in the above method embodiments, and will not be repeated here.

In the above embodiments, the description of each embodiment has its own emphasis. For the part not detailed or recorded in one embodiment, please refer to the relevant description of other embodiments.

Figure 11:
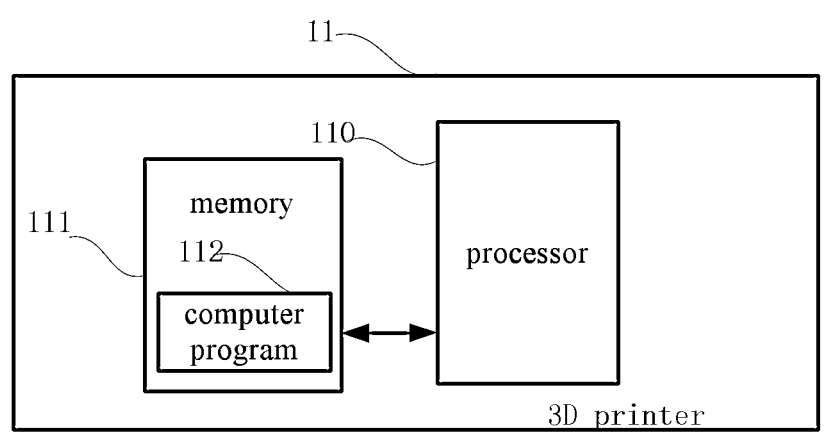
FIG. 11 is a schematic block diagram of a 3D printer in an embodiment of the present application.

FIG. 11 shows the schematic block diagram of a 3D printer provided by the embodiment of the present application. For the convenience of explanation, only the parts related to the embodiment of the present application are shown.

As shown in FIG. 11, the 3D printer 11 of the embodiment includes a processor 110, a memory 111, and a computer program 112 stored in the memory 111 and capable of running on the processor 110. When the processor 110 executes the computer program 112, it realizes the steps in the embodiment of the method for placing 3D models, such as steps S101 to S104 shown in FIG. 1. Alternatively, when the processor 110 executes the computer program 112, it realizes the functions of each module/unit in the above device embodiments, such as the functions of modules 1001 to 1004 shown in FIG. 10.

By way of example, the computer program 112 can be divided into one or more modules/units, which are stored in the memory 111 and executed by the processor 110 to complete the present application. The one or more modules/units may be a series of computer program instruction segments capable of performing specific functions, which are used to describe the execution process of the computer program 112 in the 3D printer 11.

Those skilled in the art can understand that FIG. 11 is only an example of the 3D printer 11, and does not constitute a definition of the 3D printer 11. It can include more or fewer components than shown, or combine some components, or different components. For example, the 3D printer 11 can also include input and output devices, network access devices, buses, and so on.

The processor 110 can be CPU (Central Processing Unit), and can also be other general purpose processor, DSP (Digital Signal Processor), ASIC (Application Specific Integrated Circuit), FGPA (Field-Programmable Gate Array), or some other programmable logic devices, discrete gate or transistor logic device, discrete hardware component, etc. The general purpose processor can be a microprocessor, or alternatively, the processor can also be any conventional processor and so on.

The memory 111 can be an internal storage unit of the 3D printer 11, such as a hard disk or a memory of the 3D printer 11. The memory 111 can also be an external storage device of the 3D printer 11, such as a plug-in hard disk, a SMC (Smart Media Card), a SD (Secure Digital) card, a FC (Flash Card) equipped on the measuring device 10. Further, the memory 111 may include both the internal storage unit and the external storage device of the 3D printer 11, either. The memory 111 is configured to store the computer programs, and other procedures and data needed by the 3D printer 11 for determining well bore cross-sectional shape. The memory 111 can also be configured to storing data that has been output or being ready to be output temporarily.

It can be clearly understood by the persons skilled in the art that, for describing conveniently and concisely, dividing of the aforesaid various functional units, functional modules is described exemplarily merely, in an actual application, the aforesaid functions can be assigned to different functional units and functional modules to be accomplished, that is, an inner structure of a data synchronizing device is divided into functional units or modules so as to accomplish the whole or a part of functionalities described above. The various functional units, modules in the embodiments can be integrated into a processing unit, or each of the units exists independently and physically, or two or more than two of the units are integrated into a single unit. The aforesaid integrated unit can by either actualized in the form of hardware or in the form of software functional units. In addition, specific names of the various functional units and modules are only used for distinguishing from each other conveniently, but not intended to limit the protection scope of the present application. Regarding a specific working process of the units and modules in the aforesaid device, reference can be made to a corresponding process in the aforesaid method embodiments, it is not repeatedly described herein.

In the aforesaid embodiments, the description of each of the embodiments is emphasized respectively, regarding a part of one embodiment which isn't described or disclosed in detail, please refer to relevant descriptions in some other embodiment.

Those skilled in the art may aware that, the elements and algorithm steps of each of the examples described in connection with the embodiments disclosed herein can be implemented in electronic hardware, or in combination with computer software and electronic hardware. Whether these functions are implemented by hardware or software depends on the specific application and design constraints of the technical solution. The skilled people could use different methods to implement the described functions for each particular application, however, such implementations should not be considered as going beyond the scope of the present application.

It should be understood that, in the embodiments of the present application, the disclosed device/3D printer and method could be implemented in other ways. For example, the device/3D printer described above are merely illustrative; for example, the division of the units is only a logical function division, and other division could be used in the actual implementation, for example, multiple units or components could be combined or integrated into another system, or some features can be ignored, or not performed. In another aspect, the coupling or direct coupling or communicating connection shown or discussed could be an indirect, or a communicating connection through some interfaces, devices or units, which could be electrical, mechanical, or otherwise.

The units described as separate components could or could not be physically separate, the components shown as units could or could not be physical units, which can be located in one place, or can be distributed to multiple network elements. Parts or all of the elements could be selected according to the actual needs to achieve the object of the present embodiment.

In addition, the various functional units in each of the embodiments of the present application can be integrated into a single processing unit, or exist individually and physically, or two or more than two units are integrated into a single unit. The aforesaid integrated unit can either be achieved by hardware, or be achieved in the form of software functional units.

If the integrated unit is achieved in the form of software functional units, and is sold or used as an independent product, it can be stored in a computer readable storage medium. Based on this understanding, a whole or part of flow process of implementing the method in the aforesaid embodiments of the present application can also be accomplished by using computer program to instruct relevant hardware. When the computer program is executed by the processor, the steps in the various method embodiments described above can be implemented. Wherein, the computer program comprises computer program codes, which can be in the form of source code, object code, executable documents or some intermediate form, etc. The computer readable medium can include: any entity or device that can carry the computer program codes, recording medium, USB flash disk, mobile hard disk, hard disk, optical disk, computer storage device, ROM (Read-Only Memory), RAM (Random Access Memory), etc.

As stated above, the aforesaid embodiments are only intended to explain but not to limit the technical solutions of the present application. Although the present application has been explained in detail with reference to the above-described embodiments, it should be understood for the ordinary skilled one in the art that, the technical solutions described in each of the above-described embodiments can still be amended, or some technical features in the technical solutions can be replaced equivalently; these amendments or equivalent replacements, which won't make the essence of corresponding technical solution to be broken away from the spirit and the scope of the technical solution in various embodiments of the present application, should all be included in the protection scope of the present application.

What is claimed is:
1. A method for placing a 3D model, comprising:
performing a dimension reduction processing to a first 3D model and a second 3D model, respectively, to obtain a first plane graphics corresponding to the first 3D model and a second plane graphics corresponding to the second 3D model;
determining a minimum bounding rectangle of the first plane graphics;
determining a convex hull of the second plane graphics, and determining an insertion point in the convex hull; and performing a successive insertion attempt to the minimum bounding rectangle at the insertion point, and determining a final placement position;
wherein the step of determining the insertion point in the convex hull comprises:
sampling the convex hulls to obtain depth values of sampling points;
traversing the depth values of the sampling points using a monotone queue algorithm to obtain output values of the sampling points; and
determining a sample point with a greatest output value to be the insertion point.

2. The method for placing the 3D model according to claim 1, wherein the step of traversing the depth values of the sampling points using monotone queue algorithm to obtain output values of the sampling points comprises:
constructing a depth value sequence through the depth values of the sampling points;
determining a sliding window corresponding to the minimum bounding rectangle; and
successively sliding the sliding window in the depth value sequence using the monotone queue algorithm, to obtain the output values of the sliding window at the sampling points.

3. The method for placing the 3D model according to claim 1, wherein the step of performing a successive insertion attempt to the minimum bounding rectangle at the insertion point, and determining a final placement position comprises:
performing, using a dichotomy approximation algorithm, the successive insertion attempt to the minimum bounding rectangle at the insertion point, until a boundary collision occurs between the minimum bounding rectangle and the second plane graphics;
determining a position before the boundary collision occurs between the minimum bounding rectangle and the second plane graphics to be a first position;
performing, using dichotomy approximation algorithm, the successive insertion attempt to the first plane graphics starting from the first position, until the boundary collision occurs between the first plane graphics and the second plane graphics; and
determining a position before the boundary collision occurs between the first plane graphics and the second plane graphics to be the final placement position.

4. The method for placing the 3D model according to claim 3, wherein the step of performing, using a dichotomy approximation algorithm, the successive insertion attempt to the minimum bounding rectangle at the insertion point comprises:
determining a half of an advance depth of a n-th insertion attempt to be an advance depth of a (n+1)-th insertion attempt, wherein the n is a positive integer.

5. The method for placing the 3D model according to claim 1, wherein the step of performing a dimension reduction processing to a first 3D model and a second 3D model, respectively, to obtain a first plane graphics corresponding to the first 3D model and a second plane graphics corresponding to the second 3D model comprises:
projecting the first 3D model and the second 3D model onto a preset plane at a preset angle to obtain the first plane graphics and the second plane graphics.

6. The method for placing the 3D model according to claim 1, before performing the dimension reduction processing to a first 3D model and a second 3D model, respectively, the method further comprising:
importing a preset standard 3D model; and
performing a model cloning according to the standard 3D model to obtain the first 3D model and the second 3D model.

7. A device for placing a 3D model, comprising:
a dimension reduction processing module, configured for performing a dimension reduction processing to a first 3D model and a second 3D model, respectively, to obtain a first plane graphics corresponding to the first 3D model and a second plane graphics corresponding to the second 3D model;
a minimum bounding rectangle determination module, configured for determining a minimum bounding rectangle of the first plane graphics;
an insertion point determination module, configured for determining a convex hull of the second plane graphics, and determining an insertion point in the convex hull; and
an insertion attempt module, configured for performing a successive insertion attempt to the minimum bounding rectangle at the insertion point, and determining a final placement position;
wherein the insertion point determination module comprises:
a sampling unit, configured for sampling the convex hulls to obtain depth values of sampling points;
a monotone queue processing unit, configured for traversing the depth values of the sampling points using monotone queue algorithm to obtain output values of the sampling points; and
an insertion point determination unit, configured for determining a sample point with a greatest output value to be the insertion point.

8. The device for placing the 3D model according to claim 7, wherein the monotone queue processing unit comprises:
a depth value sequence construction sub-unit, configured for constructing a depth value sequence through the depth values of the sampling points;
a sliding window length determination sub-unit, configured for determining a sliding window corresponding to the minimum bounding rectangle; and
a monotone queue processing sub-unit, configured for successively sliding the sliding window in the depth value sequence using the monotone queue algorithm, to obtain the output values of the sliding window at the sampling points.

9. The device for placing the 3D model according to claim 7, wherein the insertion attempt module comprises:
a first processing unit, configured for performing, using a dichotomy approximation algorithm, the successive insertion attempt to the minimum bounding rectangle at the insertion point, until a boundary collision occurs between the minimum bounding rectangle and the second plane graphics;
a first position determination unit, configured for determining a position before the boundary collision occurs between the minimum bounding rectangle and the second plane graphics to be a first position;
a second processing unit, configured for performing, using dichotomy approximation algorithm, the successive insertion attempt to the first plane graphics starting from the first position, until the boundary collision occurs between the first plane graphics and the second plane graphics; and
a final position determination unit, configured for determining a position before the boundary collision occurs between the first plane graphics and the second plane graphics to be the final placement position.

10. The device for placing the 3D model according to claim 9, wherein the first processing unit comprises:
- an advance dept determination sub-unit, configured for determining a half of an advance depth of a n-th insertion attempt to be an advance depth of a (n+1)-th insertion attempt, wherein the n is a positive integer.

11. The device for placing the 3D model according to claim 7, wherein the dimension reduction processing module specifically configured for projecting the first 3D model and the second 3D model onto a preset plane at a preset angle to obtain the first plane graphics and the second plane graphics.

12. The device for placing the 3D model according to claim 7, further comprising:
- a model importing module, configured for importing a preset standard 3D model; and
- a model cloning module, configured for performing a model cloning according to the standard 3D model to obtain the first 3D model and the second 3D model.

13. A non-transitory computer-readable storage medium, wherein the non-transitory computer-readable storage medium stores a computer program, when the computer program is executed by a processor, steps of implementing the method for placing the 3D model according to claim 1 are executed.

14. A 3D printer, comprising a memory, a processor and a computer program stored in the memory and capable of running on the processor, wherein the processor implements the steps of the method for placing the 3D model according to claim 1 when executing the computer program.

* * * * *